US00RE45057E

(19) United States
(12) Reissued Patent
Hashizume et al.

(10) Patent Number: US RE45,057 E
(45) Date of Reissued Patent: Aug. 5, 2014

(54) METHOD OF MANUFACTURING AN INK JET RECORDING HEAD HAVING PIEZOELECTRIC ELEMENT

(71) Applicant: Seiko Epson Corporation, Tokyo (JP)

(72) Inventors: Tsutomu Hashizume, Nagano (JP); Tetsushi Takahashi, Nagano (JP)

(73) Assignee: Seiko Epson Corporation, Tokyo (JP)

(21) Appl. No.: 13/673,659

(22) Filed: Nov. 9, 2012

Related U.S. Patent Documents

Reissue of:
(64) Patent No.: 7,827,659
Issued: Nov. 9, 2010
Appl. No.: 11/844,966
Filed: Aug. 24, 2007

U.S. Applications:
(60) Division of application No. 10/606,182, filed on Jun. 26, 2003, now Pat. No. 7,354,140, which is a continuation of application No. 08/788,959, filed on Jan. 24, 1997, now Pat. No. 6,609,785.

(30) Foreign Application Priority Data

Jan. 26, 1996 (JP) ..... 8-012113
Feb. 22, 1996 (JP) ..... 8-035255
Jan. 20, 1997 (JP) ..... 9-008075

(51) Int. Cl.
*H04R 17/00* (2006.01)
*B44C 1/22* (2006.01)

(52) U.S. Cl.
USPC ..... 29/25.35; 29/890.1; 29/846; 216/62; 216/67

(58) Field of Classification Search
USPC ..... 29/25.35, 890.1, 831, 846; 310/312, 310/365, 366, 328, 331; 347/68–72; 438/33; 216/62, 67; 313/309
See application file for complete search history.

(56) References Cited

U.S. PATENT DOCUMENTS 3,742,598 A 7/1973 Nishida
3,969,686 A 7/1976 Scifres et al.
4,406,967 A 9/1983 Obara et al.
4,641,153 A 2/1987 Cruz-Uribe
4,680,595 A 7/1987 Cruz-Uribe et al.

(Continued)

FOREIGN PATENT DOCUMENTS

DE 2 256 667 6/1974
DE 2256667 A1 6/1974

(Continued)

OTHER PUBLICATIONS

Machine Language Translation of JP 5-177831.*

*Primary Examiner* — A. Dexter Tugbang
(74) *Attorney, Agent, or Firm* — Sughrue Mion, PLLC

(57) ABSTRACT

A method of manufacturing an ink jet recording head. The method includes providing a laminated structure in which a first electrode layer is located on a diaphragm, a piezoelectric layer is located on the first electrode layer, and a second electrode layer is located on the piezoelectric layer and etching the first electrode layer, the second electrode layer and the piezoelectric layer so that a portion of the diaphragm is exposed. In this method, at least the second electrode layer and the piezoelectric layer are etched simultaneously.

8 Claims, 18 Drawing Sheets

(56) References Cited

U.S. PATENT DOCUMENTS

| | | | | | |
|---|---|---|---|---|---|
| 4,730,197 | A | | 3/1988 | Raman et al. | |
| 4,747,192 | A | | 5/1988 | Rokurota | |
| 5,024,724 | A | | 6/1991 | Hirono et al. | |
| 5,087,930 | A | | 2/1992 | Roy et al. | |
| 5,126,615 | A | | 6/1992 | Takeuchi et al. | |
| 5,366,587 | A | * | 11/1994 | Ueda et al. | 216/67 X |
| 5,376,856 | A | | 12/1994 | Takeuchi et al. | |
| 5,386,172 | A | * | 1/1995 | Komatsu | 313/309 |
| 5,446,484 | A | | 8/1995 | Hoisington et al. | |
| 5,530,465 | A | | 6/1996 | Hasegawa et al. | |
| 5,581,861 | A | | 12/1996 | Lee et al. | |
| 5,637,126 | A | | 6/1997 | Ema et al. | |
| 5,719,607 | A | | 2/1998 | Hasegawa et al. | |
| 5,754,205 | A | | 5/1998 | Miyata et al. | |
| 5,802,686 | A | | 9/1998 | Shimada et al. | |
| 5,825,121 | A | | 10/1998 | Shimada | |
| 5,855,049 | A | | 1/1999 | Corbett, III et al. | |
| 5,889,352 | A | | 3/1999 | Takeuchi et al. | |
| 5,923,352 | A | | 7/1999 | Kikuchi et al. | |
| 5,940,947 | A | | 8/1999 | Takeuchi et al. | |
| 5,956,829 | A | | 9/1999 | Kitahara et al. | |
| 5,984,458 | A | | 11/1999 | Murai | |
| 6,019,458 | A | | 2/2000 | Shimada et al. | |
| 6,108,880 | A | | 8/2000 | Takeuchi et al. | |
| 6,140,746 | A | | 10/2000 | Miyashita et al. | |
| 6,912,760 | B2 | | 7/2005 | Uchiyama et al. | |

FOREIGN PATENT DOCUMENTS

| | | | | | |
|---|---|---|---|---|---|
| EP | 0408306 | A2 | | 1/1991 | |
| EP | 0573055 | A2 | | 12/1993 | |
| EP | 0666605 | A1 | | 8/1995 | |
| JP | 05-169654 | | | 7/1933 | |
| JP | 59169215 | A | | 9/1984 | |
| JP | 60-72409 | | * | 4/1985 | 29/25.35 |
| JP | 60072409 | A | | 4/1985 | |
| JP | 02-219654 | | | 9/1990 | |
| JP | 02219654 | A | | 9/1990 | |
| JP | 3297653 | A | | 12/1991 | |
| JP | 05-177831 | | | 7/1993 | |
| JP | 05-177832 | | | 7/1993 | |
| JP | 5169654 | A | | 7/1993 | |
| JP | 05177831 | A | | 7/1993 | |
| JP | 05177832 | A | | 7/1993 | |
| JP | 05-286131 | | | 11/1993 | |
| JP | 5286131 | A | | 11/1993 | |
| JP | 06-134983 | | | 5/1994 | |
| JP | 06134983 | A | | 5/1994 | |
| JP | 7246705 | A | | 9/1995 | |
| JP | 08-306980 | | | 11/1996 | |
| JP | 8306980 | A | | 11/1996 | |
| JP | 11-227196 | | | 8/1999 | |
| JP | 11227196 | A | | 8/1999 | |
| WO | 9322140 | A1 | | 11/1993 | |
| WO | WO 93/22140 | | | 11/1993 | |

* cited by examiner

METHOD OF MANUFACTURING AN INK JET RECORDING HEAD HAVING PIEZOELECTRIC ELEMENT

Matter enclosed in heavy brackets [ ] appears in the original patent but forms no part of this reissue specification; matter printed in italics indicates the additions made by reissue.

CROSS-REFERENCE TO RELATED APPLICATIONS

This is a divisional of application Ser. No. 10/606,182 filed Jun. 26, 2003. Application Ser. No. 10/606,182 is a continuation of application Ser. No. 08/788,959 filed Jan. 24, 1997, now U.S. Pat. No. 6,609,785. Priority is claimed from JPA 8-012113 filed Jan. 26, 1996, from JPA 8-035255 filed Feb. 22, 1996, and also from JPA 9-008075 filed Jan. 20, 1997. Application Ser. No. 11/481,848 filed Jul. 7, 2006 is also a divisional of application Ser. No. 10/606,182. Application Ser. No. 11/585,247 is another divisional of application Ser. No. 10/606,182. Application Ser. No. 09/238,980, now U.S. Pat. No. 6,402,971 B2 is a divisional of application Ser. No. 08/788,959. The entire disclosures of the prior applications, application Ser. Nos. 10/606,182 and 08/788,959, and the above-identified priority documents, are hereby incorporated by reference.

BACKGROUND OF THE INVENTION

This invention relates to an ink jet recording head using a piezoelectric thin film for an ink jet drive source and a manufacturing method therefor. Further, it relates to an ink jet recorder using the recording head.

There is a piezoelectric ink jet recording head using PZT elements comprising PZT of piezoelectric elements as electro-mechanical transducer elements of liquid or ink jet drive source. This type of the piezoelectric ink jet recording head is proposed in, for example, Japanese Patent Application Laid-Open No. Hei 5-286131.

This conventional head will be discussed with reference to FIG. 10. The recording head has separate ink passages (ink pressure chambers) 9 on a head base 1 and a diaphragm 8 so as to cover the separate ink passages 9. A common electrode (lower electrode) 3 is formed so that it is attached to the diaphragm 8, and PZT elements 4 are placed so as to reach the tops of the separate ink passages 9, a separate electrode (upper electrode) 5 being placed on one face of the PZT element.

In the recording head, an electric field is applied to the PZT element for displacing the same, thereby pushing out ink in the separate ink passage from a nozzle of the separate ink passage.

The sequence of events for the inventor to diligently study conventional ink jet recording heads and reach the invention will be discussed.

In the conventional ink jet recording head previously described, a pattern shift occurs between the PZT element and the upper electrode and even if they are patterned with the same pattern, it is feared that a leak between the upper electrode and the common electrode will occur due to a pattern shift between the PZT element and the upper electrode.

Then, to attempt to avoid this problem, it becomes necessary to make the upper electrode pattern smaller than the PZT element pattern. That is, the form shown in FIG. 10 is changed to that in FIG. 11. In doing so, it is feared that the electric field on the upper electrode 5 side will not be applied to the piezoelectric part where the upper electrode does not exist, worsening the efficiency for jetting ink.

That is, the part of the piezoelectric body, to which no electric field is applied, not deformed restrains the deformed part, lessening displacement of the entire piezoelectric body. If the upper electrode is not positioned at the width direction center of the piezoelectric film, namely, the widths of the undeformed parts of the piezoelectric film at the left $\Delta X1$ and right $\Delta X2$ shown in the FIG. 43 differ ($\Delta X1 > \Delta X2$, for instance), the piezoelectric film deformation becomes distorted, lowering the jet characteristic and stability. The same reference numbers in FIGS. 10, 11 and 43 are used to designate the same elements.

Then, to solve the problem, the inventor forms the piezoelectric body as a thin film and etches the piezoelectric thin film and separate electrodes at the same time, for example, by using a photolithography technique, thereby providing a new ink jet recording head with the piezoelectric thin film and electrodes patterned in the same shape.

On the other hand, to jet ink equal to or more than ink with an ink jet using a bulk piezoelectric body for piezoelectric thin film of thin PZT element, it is desirable to form a PZT thin film having an extremely large piezoelectric constant more than bulk PZT for deforming a diaphragm.

Generally, the piezoelectric constant of the PZT thin film is only a half to a third of the piezoelectric constant of bulk PZT and if only PZT elements differ and other design values are the same, it is difficult to use the PZT thin film to jet ink more than ink with bulk PZT.

A method of increasing the PZT thin film formation area is available to enable use of a PZT thin film having a small piezoelectric constant. According to this method, an amount of ink required for printing can be jetted, but if the PZT thin film area increases, ink jet recording head cannot be formed in high density and high-definition print quality cannot be provided.

SUMMARY OF THE INVENTION

It is therefore an object of the invention to provide an ink jet recording head capable of effectively applying an electric field to a piezoelectric thin film and stably providing a sufficient jet characteristic with no pattern shift between the piezoelectric thin film and an electrode.

It is another object of the invention to provide a high-definition, high-accuracy ink jet recording head while providing a sufficient ink jet amount in a small diaphragm area.

It is a further object of the invention to provide a method for manufacturing the ink jet recording head.

It is another object of the invention to provide an ink jet recorder and an ink jet printer system each comprising the recording head.

To these ends, according to one aspect of the invention, there is provided an ink jet recording head comprising a nozzle orifice for jetting ink, an ink chamber for supplying ink to the nozzle orifice, a diaphragm for pressurizing ink in the ink chamber, a piezoelectric thin film serving as a pressurization source for the diaphragm, and an electrode for the piezoelectric thin film wherein the piezoelectric thin film and the electrode are patterned to the same shape. According to the invention, the piezoelectric thin film and the electrode are patterned in the same step, so that a pattern shift does not occur between the piezoelectric thin film and the electrode and an electric field can be effectively applied to the piezoelectric thin film, stably providing a sufficient jet characteristic.

Patterning the piezoelectric thin film and the electrode to the same shape preferably can be accomplished by etching them at the same time.

In a preferred form, the piezoelectric thin film is a thin film 0.3-5 μm thick formed by a sol-gel method or a sputtering method.

Further, in the present invention, the piezoelectric thin film is formed via the diaphragm on the ink chamber not reaching the outside of the ink chamber and that the portion of the diaphragm in the area not attached to the piezoelectric thin film is thinner than the portion of the diaphragm in the area attached to the piezoelectric thin film. Therefore, the diaphragm portion in the area not attached to the piezoelectric thin film easily bends, so that a high-definition, high-accuracy ink jet recording head can be provided while providing a sufficient ink jet amount in a small diaphragm area without increasing the piezoelectric thin film area.

Preferably, the electrode comprising a common electrode to a pattern of the piezoelectric thin films and a separate electrode for the separate piezoelectric thin film, the diaphragm comprises the common electrode and an insulating film, and the portion of the common electrode not attached to the piezoelectric thin film is thinner than the portion of the common electrode attached to the piezoelectric thin film. Alternatively, the electrode comprises a common electrode to a pattern of the piezoelectric thin films and a separate electrode for the separate piezoelectric thin film and the diaphragm is made of the common electrode.

Furthermore, the electrode comprises a lower electrode and an upper electrode for separate piezoelectric thin films, the diaphragm comprises the lower electrode and an insulating film facing the ink pool, and the lower electrode is formed and attached only to areas of piezoelectric thin films. Alternatively, the area of the insulating film where the piezoelectric thin film is not formed is thinner than the area of the insulating film where the piezoelectric thin film is formed.

According to the invention, there is provided an ink jet recorder comprising the ink jet recording head.

According to another aspect of the invention, there is provided a method for manufacturing an ink jet recording head, comprising a first step of forming an ink chamber for supplying ink to a nozzle orifice for jetting ink on a substrate, a second step of forming on the substrate a diaphragm for pressurizing ink in the ink chamber, a piezoelectric thin film serving as a pressurization source for the diaphragm, and an electrode for the piezoelectric thin film in sequence, and a third step of patterning the piezoelectric thin film and the electrode.

Preferably, the second step provides the electrode comprising a common electrode to a pattern of the piezoelectric thin films and a separate electrode for the separate piezoelectric thin film and makes a projection area of the separate electrode opposite to a surface of the common electrode the same as an area of surface of the separate piezoelectric thin film. The third step dry-etches the separate electrode and the piezoelectric thin film in batch. Preferably, the dry etching is an ion milling method or a reactive ion etching method.

Preferably, the second step comprises the steps of forming and attaching an insulating film onto a surface of the substrate, forming and attaching a first electrode, forming and attaching a piezoelectric thin film onto the electrode, and forming and attaching a second electrode onto the piezoelectric thin film and the third step comprises the steps of patterning a resist on the second electrode by photolithography, patterning the second electrode and the piezoelectric thin film with the resist as a mask by a first etching method, and thinning the first electrode by a second etching method.

DETAILED DESCRIPTION OF THE INVENTION

Referring now to the accompanying drawings, there are shown preferred embodiments of the invention. First, a first embodiment of the invention will be discussed based on FIGS. 1 to 8.

Figure 1:
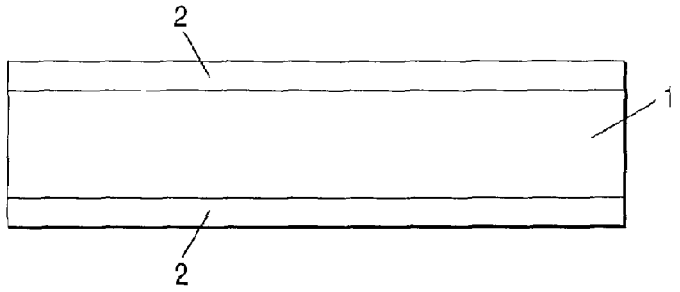
FIG. 1 is a first process drawing of a manufacturing method of an ink jet recording head in a first embodiment of the invention.

As shown in FIG. 1, a silicon substrate is used as a head base 1 for forming an ink chamber and 1-μm silicon thermal oxide films 2 are formed as diaphragms. In addition, a common electrode and silicon nitride, zirconium, zirconia, etc., can be used as diaphragms of the common electrode.

Figure 2:
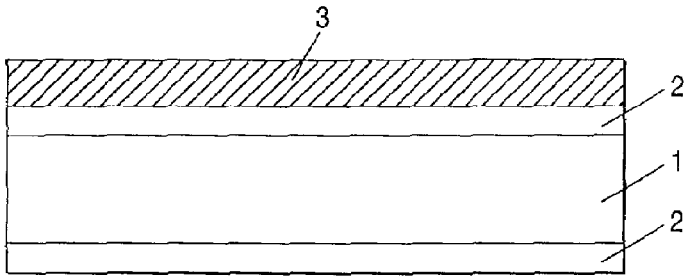
FIG. 2 is a second process drawing of the manufacturing method of the ink jet recording head in the first embodiment of the invention.
Figure 3:
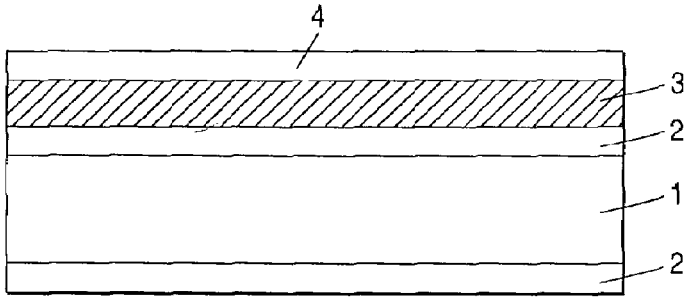
FIG. 3 is a third process drawing of the manufacturing method of the ink jet recording head in the first embodiment of the invention.
Figure 4:
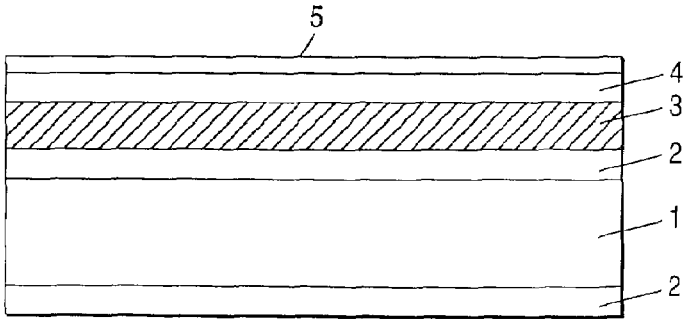
FIG. 4 is a fourth process drawing of the manufacturing method of the ink jet recording head in the first embodiment of the invention.

Next, a platinum film 0.8 pm thick is sputtered on the silicon thermal oxide film 2 as a common electrode 3 and a piezoelectric thin film 4 is formed on the common electrode 3, a platinum film 0.1 μm thick being sputtered on the piezoelectric thin film 4 as an upper electrode 5, as shown in FIGS. 2 to 4. In the embodiment, the silicon thermal oxide film 2 and the common electrode 3 function as a diaphragm. In addition, the upper electrode may be made of any material if the material is good in electric conductivity; for example, aluminum, gold, nickel, indium, etc., can be used.

The piezoelectric thin film 4 is formed by a sol-gel method of a manufacturing method for providing a thin film by a simple system. To use the piezoelectric thin film for an ink jet recording head, a lead zirconate titanate (PZT) family is optimum among materials showing a piezoelectric characteristic. A coat of prepared PZT family sol is applied onto the common electrode 3 by a spin coater and temporarily calcined at 400° C., forming an amorphous porous gel thin film. Further, sol application and temporary calcining are repeated twice for forming a porous gel thin film.

Next, to provide a perovskite crystal, RTA (Rapid Thermal Annealing) is subjected to heating to 650° C. in five seconds in an oxygen atmosphere and holding for one minute for preannealing, forming a tight PZT thin film. A process of applying a coat of the sol by the spin coater and temporarily calcining to 400° C. is repeated three times for laminating amorphous porous gel thin films.

Next, RTA is subjected to preannealing at 650° C. and holding for one minute, thereby forming a crystalline tight thin film. Further, RTA is subjected to heating to 900° C. in an oxygen atmosphere and hold for one minute for annealing, resulting in the piezoelectric thin film 4 1.0 gm thick. The piezoelectric thin film can also be manufactured by a sputtering method.

Figure 5:
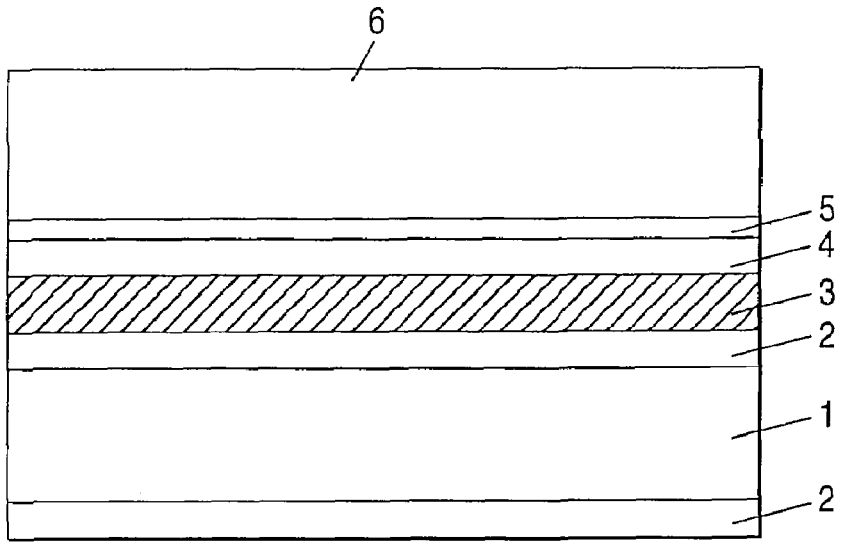
FIG. 5 is a fifth process drawing of the manufacturing method of the ink jet recording head in the first embodiment of the invention.
Figure 6:
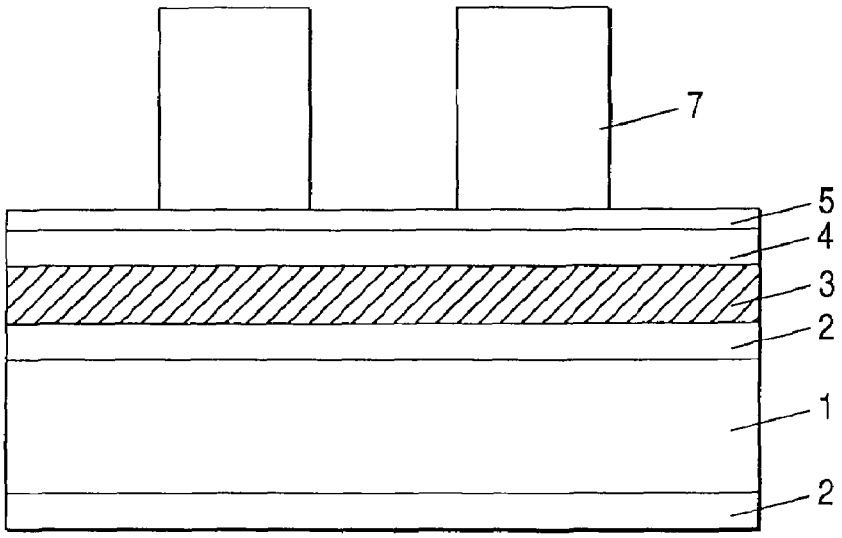
FIG. 6 is a sixth process drawing of the manufacturing method of the ink jet recording head in the first embodiment of the invention.

Next, as shown in FIG. 5, a coat of a negative resist 6 (HR-100: Fuji hunt) is applied onto the upper electrode 5 by the spin coater. The negative resist 6 is exposed, developed, and baked at desired positions of the piezoelectric thin film by masking for forming hardened negative resists 7 as shown in FIG. 6. Positive resists can also be used in place of the negative resists.

Figure 7:
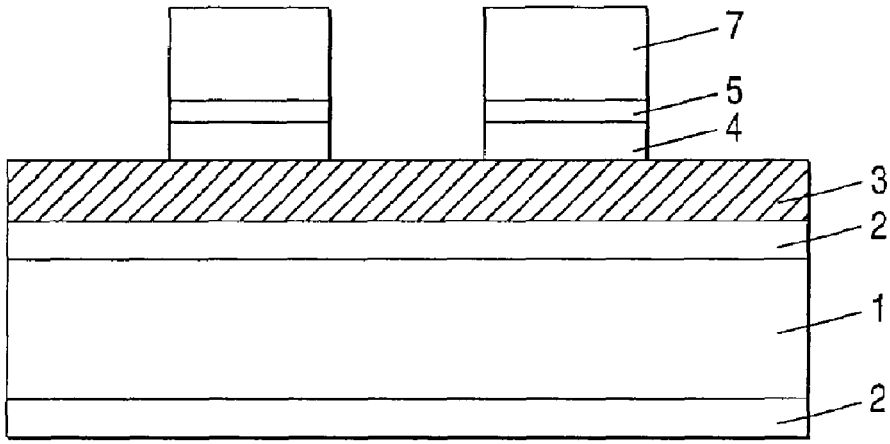
FIG. 7 is a seventh process drawing of the manufacturing method of the ink jet recording head in the first embodiment of the invention.

In this state, a dry etching system, such as an ion milling system, is used to etch both of the upper electrode 5 and the piezoelectric thin film 4 in batch at this step until the common electrode 3 is exposed, as shown in FIG. 7, and both the upper electrodes 5 and the piezoelectric thin films 4 are patterned in the same pattern matched with the desired shape formed by the negative resist 6.

Figure 8:
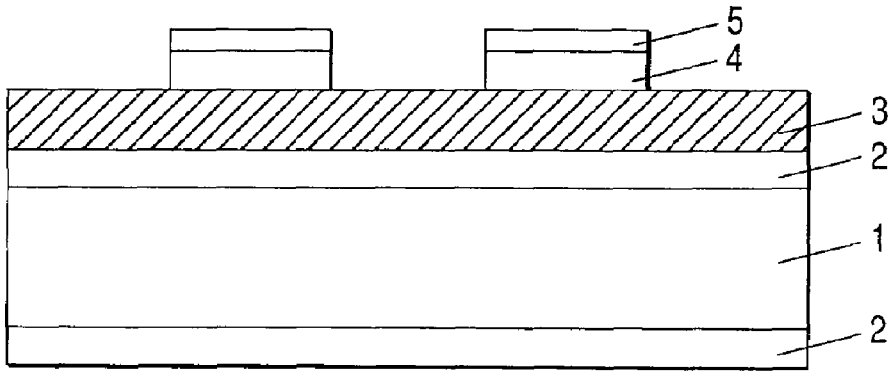
FIG. 8 is an eighth process drawing of the manufacturing method of the ink jet recording head in the first embodiment of the invention.

Last, the hardened negative resists 7 are removed by an ashing system. The patterning is now complete, as shown in FIG. 8. Since the ion milling system etches the negative resists 7 as well as the upper electrode and piezoelectric thin film, it is desired to adjust the negative resist thickness considering each etching rate depending on the etching depth. In the embodiment, the etching rates are almost the same, thus the negative resist thickness is adjusted to 2 μm.

To etch the upper electrode and piezoelectric thin film in batch, preferably the piezoelectric thin film is thinner and particularly in the range of 0.3-5 μm. If the piezoelectric thin film becomes thick, the resist must also be thick accordingly. Resultantly, if the piezoelectric thin film exceeds 5 μm in thickness, micromachining becomes difficult to perform and a high-density head cannot be provided because the resist pattern shape becomes unstable, etc. If the piezoelectric thin film is smaller than 0.3 μm in thickness, resistance to destruction pressure may not be sufficient large.

In addition to the ion milling method, reactive ion etching may be used as the dry etching method. A wet etching method can also be used. For example, a heated acid solution such as hydrochloric acid, nitric acid, sulfuric acid, or hydrofluoric acid can be used for an etchant. In this case, however, the electrode material of the upper electrode should be etched with etchant. Since wet processing it inferior to dry etching in patterning accuracy and limitations on electrode material, the dry etching is preferred.

Figure 9:
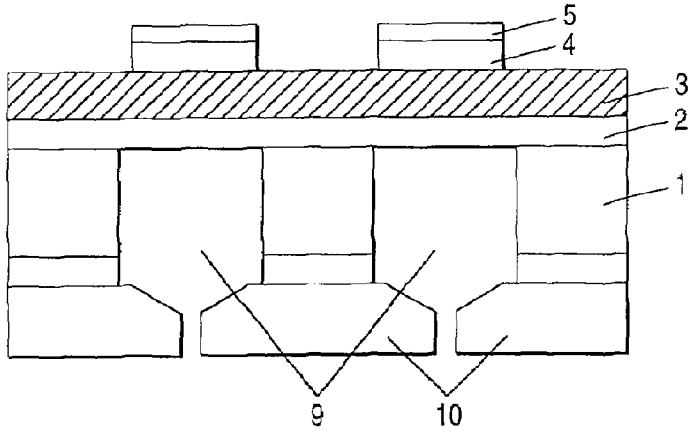
FIG. 9 is a sectional view to schematically represent the concept when the ink jet recording head in the first embodiment of the invention is used for an ink jet recorder.
Figure 10:
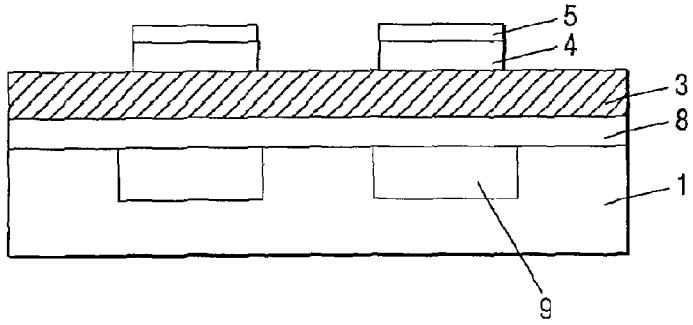
FIG. 10 PRIOR ART
FIG. 10 is a schematic sectional view of a conventional ink jet recording head.
Figure 11:
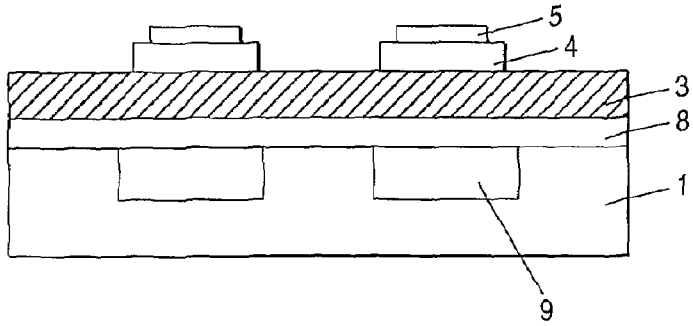
FIG. 11 PRIOR ART
FIG. 11 is a schematic sectional view of the conventional ink jet recording head.

To complete the ink jet recording head, as shown in FIG. 9, ink chambers 9 each 0.1 mm wide, ink supply passages for supplying ink to the ink chambers 9, and an ink reservoir communicating with the ink supply passages are formed by anisotropic etching from the lower face of the head base 1 (the face opposite to the piezoelectric thin film formation face), and nozzle plates 10 for forming a nozzle orifice for jetting ink are joined at the positions corresponding to the ink chambers 9. The common electrode 3 reaches the pattern of the piezoelectric thin films 4 and is formed on the oxide film 2.

Figure 12:
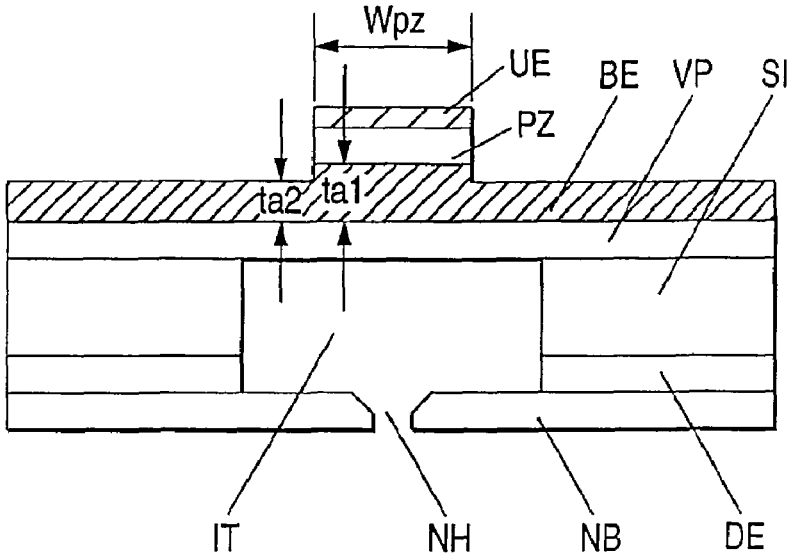
FIG. 12 is a sectional view of an ink jet recording head of the invention.
Figure 13:
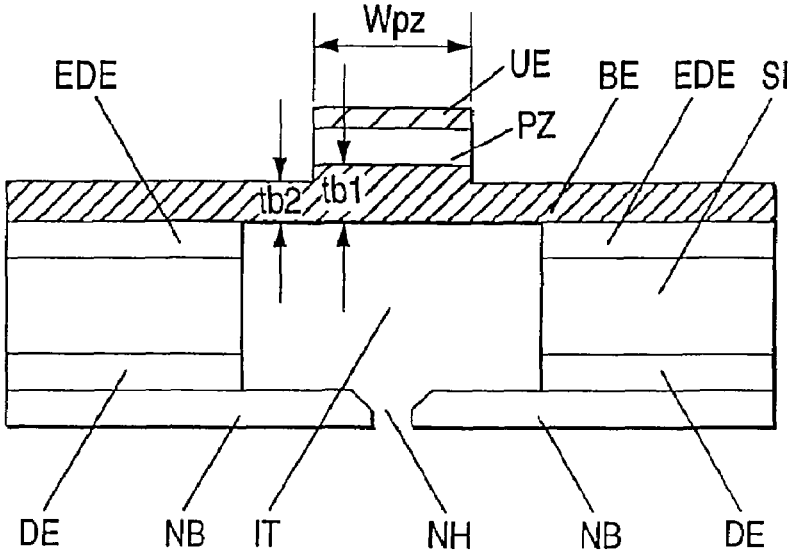
FIG. 13 is a sectional view of an ink jet recording head of the invention.

Next, another embodiment of the invention will be discussed. FIG. 12 shows a sectional view of an ink jet recording head. Diaphragms VP and BE are formed and attached so as to cover a groove-like ink chamber or pool IT separated by walls of a substrate SI. BE also serves as a common electrode of a piezoelectric thin film. In FIGS. 12 and 13, and in the other drawing figures, DE and EDE indicate a silicon oxide film, which is the same as the silicon oxide film 2 in FIG. 9, for example.

The portion of the diaphragm-cum-electrode BE in the area not attached to the piezoelectric thin film and overlapping the ink chamber IT is thinner than the portion of the diaphragm-cum-electrode BE in the area attached to, the piezoelectric thin film. Piezoelectric thin film PZ patterned to a desired pattern is attached to the diaphragm-cum-electrode BE and an upper electrode UE is formed on an opposite face of the piezoelectric thin film with respect to the electrode BE. A nozzle plate NB is bonded to the wall face of the substrate SI on the opposite side with respect to the diaphragm VP, forming the ink pool IT. The nozzle plate NB is formed with a nozzle orifice NH.

When a voltage is applied to the piezoelectric thin film of the structure, the diaphragms VP and BE just above the ink chamber are deformed convexly on the ink chamber side. Ink in an amount corresponding to the volume difference between the ink chambers before and after the deformation is jetted through the nozzle orifice NH, thereby enabling printing.

Figure 42:
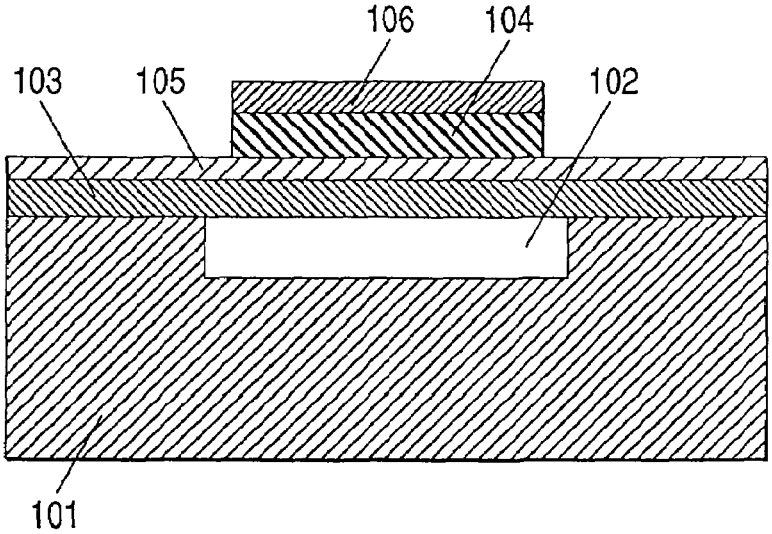
FIG. 42 PRIOR ART
FIG. 42 is a sectional view to show a conventional example.
Figure 43:
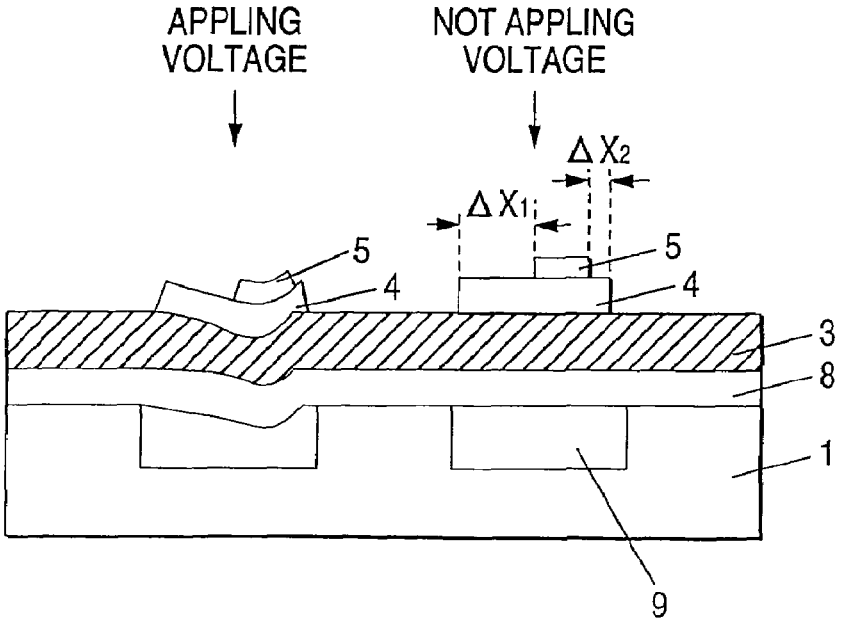
FIG. 43 PRIOR ART
FIG. 43 is another sectional view of the conventional ink jet recording head shown in FIG. 11 for explaining insufficient operations.

In the conventional ink jet head structure, as shown in FIG. 42, the thickness of the diaphragm/common electrode 103/105 is the same in the area attached to the piezoelectric thin film 104 and the area not attached to the piezoelectric thin film and overlapping the ink chamber 102 formed in the head base 1, so that a large displacement is not provided and the amount of ink required for printing is not jetted. The upper electrode is identified by reference number 106 and the corresponding lead line.

To attempt to obtain sufficient volume change in the ink chamber IT, the ink chamber needs to be lengthened remarkably. Resultantly, the head becomes a large area and very inconvenient to handle. However, the problems are solved at a stroke if the portion of the diaphragm in the area not attached to the piezoelectric thin film and overlapping the ink chamber IT is thinner than the portion of the diaphragm in the area attached to the piezoelectric thin film as in the embodiment.

That is, since the compliance of the diaphragm in area Lcb becomes large, if the same voltage is applied, the diaphragm warps larger than was previously possible, thereby providing larger ink chamber volume change than was previously possible.

Further, since the PZT element and electrode positions shift for each element, the displacement amount varies greatly from one element to another, resulting in an ink jet recording head for jetting uneven amounts of ink.

For example, in the structure in FIG. 12, if the upper UE is made of Pt and is 100 nm thick, the piezoelectric thin film PZ is made of PZT having piezoelectric distortion constant d31 of 100 pC/N and is 1000 nm thick, the width of the upper electrode UE and PZ, Wpz, is 40 μm, the diaphragm BE also serving as another electrode is made of Pt, the thickness of the area attached to the piezoelectric thin film, ta1 (FIG. 12), 800 nm, the thickness of the area not attached to the piezoelectric thin film, ta2 (FIG. 12), is 400 nm, and the diaphragm VP is made of a silicon oxide film and is 700 nm thick, when the voltage applied to the piezoelectric thin film PZ is 20 V, the maximum displacement amount of the diaphragm is 300 nm.

On the other hand, if the thicknesses of the diaphragm ta1 and ta2 are identical as 800 nm, when other conditions are the same, the maximum displacement amount of the diaphragm is 200 nm. Therefore, the embodiment enables a displacement to be provided 50% greater than was previously possible.

An ink jet printer comprising the ink jet recording head of the embodiment jets ink in the amount 50% greater than was previously possible, thus can print clear images. A wordprocessor machine comprising the ink jet recording head of the embodiment jets ink or a computer system containing an ink jet printer comprising the ink jet recording head of the embodiment jets ink in the amount 50% greater than was previously possible, thus can print clear images.

The ink jet recording head shown in FIG. 12, which has ta1>ta2, has also the following merit: If the PZT film is thermally treated up to 600° C., lead diffuses to the silicon substrate SI and lead glass having a low melting point may occur, leading to a crystal loss. While this problem is solved, the diaphragm can be formed thin by the fact that ta1>ta2.

To prevent the component of PZT of element material, Pb, from diffusing and entering silicon oxide of the diaphragm for forming lead oxide of a low-melting-point substance in thermal treatment for crystallizing the piezoelectric thin film PZ, preferably ta1 is 300 nm or more. Further, to provide a displacement of 100 nm or more when a voltage is applied to the piezoelectric thin film, preferably ta1 is 900 nm or less. That is, preferably ta1 is in the range of 300 nm to 900 nm. To balance with the compression internal stress of the silicon oxide film VP of one of diaphragm materials, preferably ta2 is 200 nm or more. The ratio between them, ta1/ta2, can be determined properly by experiments, etc., to provide a target vibration characteristic.

FIG. 13 shows a sectional view of another ink jet recording head. A diaphragm BE is formed and attached so as to cover a groove-like ink chamber IT separated by walls of a substrate SI. The diaphragm BE also serves as an electrode of a piezoelectric thin film. The portion of the diaphragm-cum-electrode BE in the area not attached to the piezoelectric thin film and overlapping the ink chamber IT is thinner than the portion of the diaphragm-cum-electrode BE in the area attached to the piezoelectric thin film. Piezoelectric thin film PZ patterned to a desired pattern is attached to the diaphragm-cum-electrode BE and an upper electrode UE is formed on an opposite face of the piezoelectric thin film with respect to the electrode BE. A nozzle plate NB is bonded to the wall face of the substrate SI on the opposite side with respect to the diaphragm BE, forming the ink chamber IT. The nozzle plate NB is formed with a nozzle orifice NH.

For example, the upper UE is made of Pt and is 100 nm thick, the piezoelectric thin film PZ is made of PZT having piezoelectric distortion constant d31 of 100 pC/N and is 1000 nm thick, the width of the upper electrode UE and PZ, Wpz, is 40 μm, the diaphragm BE also serving as another electrode is made of Pt, the thickness of the area attached to the piezoelectric thin film, tb1 (FIG. 13), 800 nm, the thickness of the area not attached to the piezoelectric thin film, tb2 (FIG. 13), is 400 nm, which is less than the thickness td3 of the area attached to the piezoelectric thin film, and the maximum displacement amount of the diaphragm is 400 nm. On the other hand, if the thicknesses of the diaphragm tb1 and tb2 are identical as 800 nm, when other conditions are the same, the maximum displacement amount of the diaphragm is 300 nm. Therefore, the embodiment enables a displacement to be provided 30% greater than was previously possible.

Figure 14:
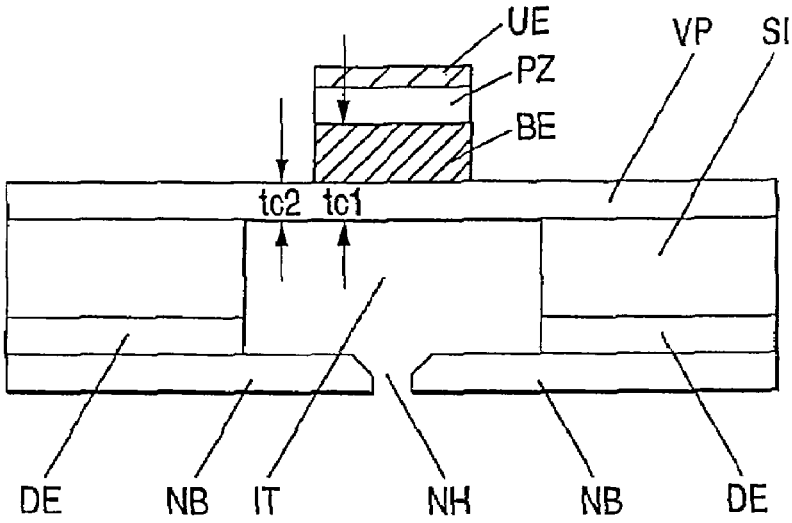
FIG. 14 is a sectional view of an ink jet recording head of the invention.

FIG. 14 shows a sectional view of another ink jet recording head. A diaphragm VP is attached and formed so as to cover a groove-like ink chamber IT separated by walls of a substrate SI. An electrode BE is formed like a band on the diaphragm VP. The electrode BE also serves as a diaphragm. A piezoelectric thin film PZ patterned to a desired pattern is attached to the diaphragm-cum-electrode BE and an upper electrode UE is formed on an opposite face of the piezoelectric thin film with respect to the electrode BE. A nozzle plate NB is bonded to the wall face of the substrate SI on the opposite side with respect to the diaphragm BE, forming the ink chamber IT. The nozzle plate NB is formed with a nozzle orifice NH.

For example, the upper UE is made of Pt and is 100 nm thick, the piezoelectric thin film PZ is made of PZT having piezoelectric distortion constant d31 of 100 pC/N and is 1000 nm thick, the width of the upper electrode UE and PZ, Wpz, is 40 μm, the diaphragm BE also serving as another electrode is made of Pt, the thickness of the area attached to the piezoelectric thin film, tc1 (FIG. 14), 800 nm, the thickness of the area not attached to the piezoelectric thin film, tc2 (FIG. 14), is 400 nm, and the maximum displacement amount of the diaphragm is 400 nm. On the other hand, if the thicknesses of the diaphragm tc1 and tc2 are identical as 800 nm, when other conditions are the same, the maximum displacement amount of the diaphragm is 300 nm. Therefore, the embodiment enables a displacement to be provided 30% greater than was previously possible.

Figure 15:
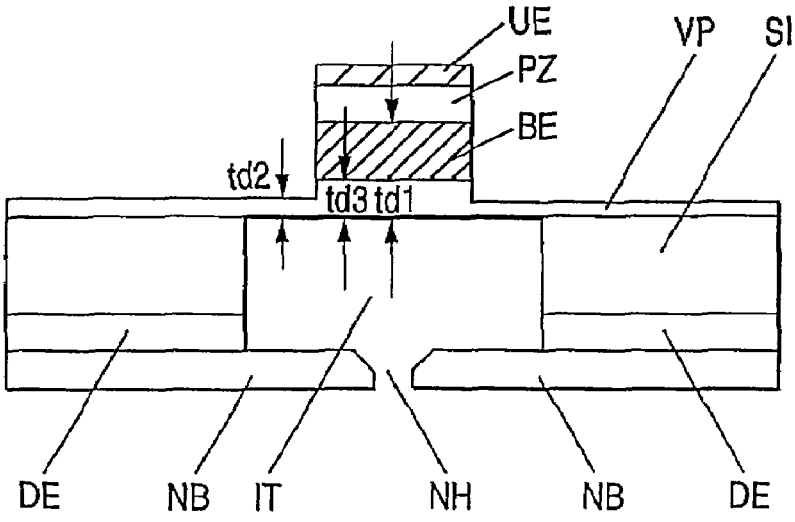
FIG. 15 is a sectional view of an ink jet recording head of the invention.

FIG. 15 shows a sectional view of another ink jet recording head. A diaphragm VP is attached and formed so as to cover a groove-like ink chamber IT separated by walls of a substrate SI. An electrode BE is formed like a band on the diaphragm VP. The electrode BE also serves as a diaphragm. The portion of the diaphragm VP in the area not attached to a piezoelectric thin film and overlapping the ink chamber IT is thinner than the portion of the diaphragm VP in the area attached to the piezoelectric thin film. Piezoelectric thin film PZ patterned to a desired pattern is attached to the diaphragm-cum-electrode BE and an upper electrode UE is formed on an opposite face of the piezoelectric thin film with respect to the electrode BE. A nozzle plate NB is bonded to the wall face of the substrate SI on the opposite side with respect to the diaphragm BE, forming the ink chamber IT. The nozzle plate NB is formed with a nozzle orifice NH.

For example, the upper UE is made of Pt and is 100 nm thick, the piezoelectric thin film PZ is made of PZT having piezoelectric distortion constant d31 of 100 pC/N and is 1000 nm thick, the width of the upper electrode UE and PZ, Wpz, is 40 μm, the diaphragm BE also serving as another electrode is made of Pt, the thickness of the area attached to the piezoelectric thin film, td1 (FIG. 15), 800 nm, the thickness of the area not attached to the piezoelectric thin film, td2 (FIG. 15), is 400 nm, and the maximum displacement amount of the diaphragm is 400 nm. On the other hand, if the thicknesses of the diaphragm td1 and td2 are identical as 800 nm, when other conditions are the same, the maximum displacement amount of the diaphragm is 300 nm. Therefore, the embodiment enables a displacement to be provided 30% greater than was previously possible.

Figure 16:
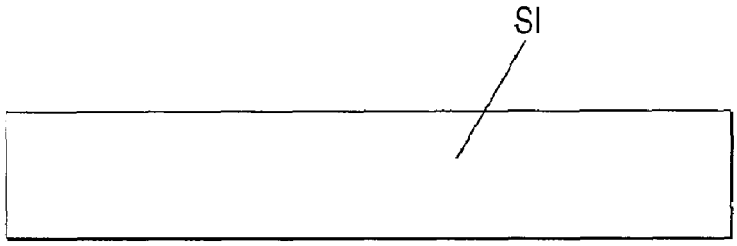
FIG. 16 is a sectional view of a step of a manufacturing method of the ink jet recording head of the invention.
Figure 17:
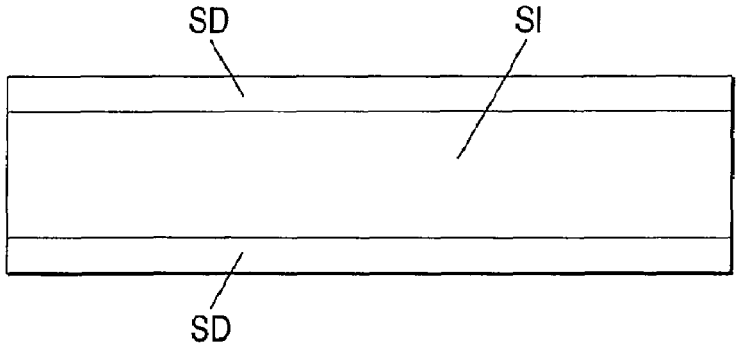
FIG. 17 is a sectional view of a step of the manufacturing method of the ink jet recording head of the invention.
Figure 18:
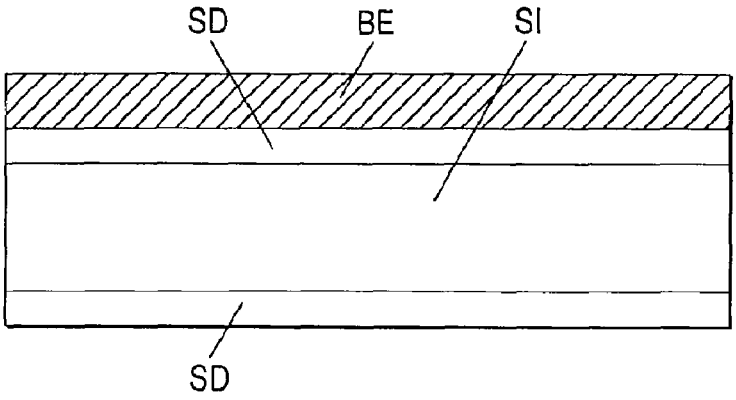
FIG. 18 is a sectional view of a step of the manufacturing method of the ink jet recording head of the invention.

Next, a manufacturing method of the ink jet recording head shown in FIG. 12 will be discussed. As shown in FIG. 17, an insulating film SD is formed on both faces of a substrate SI as shown in FIG. 16. Next, as shown in FIG. 18, a diaphragm-cum-electrode BE of a conductive film is formed and attached onto the insulating film SD on one face of the substrate SI.

Figure 19:
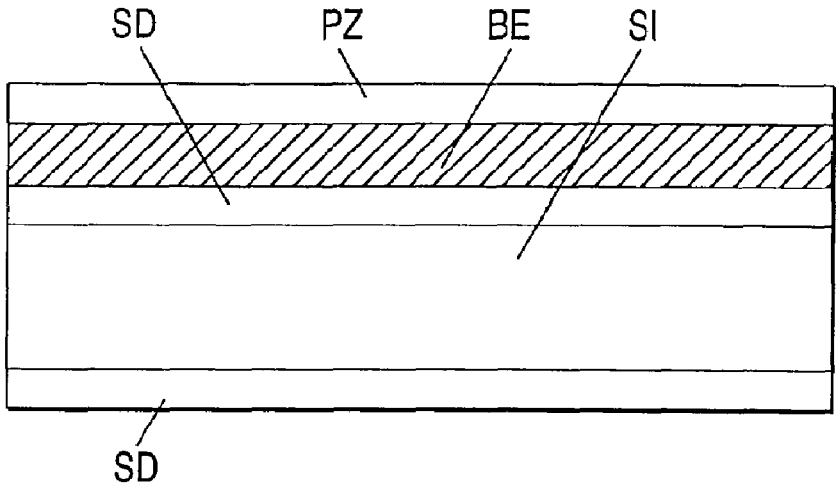
FIG. 19 is a sectional view of a step of the manufacturing method of the ink jet recording head of the invention.
Figure 20:
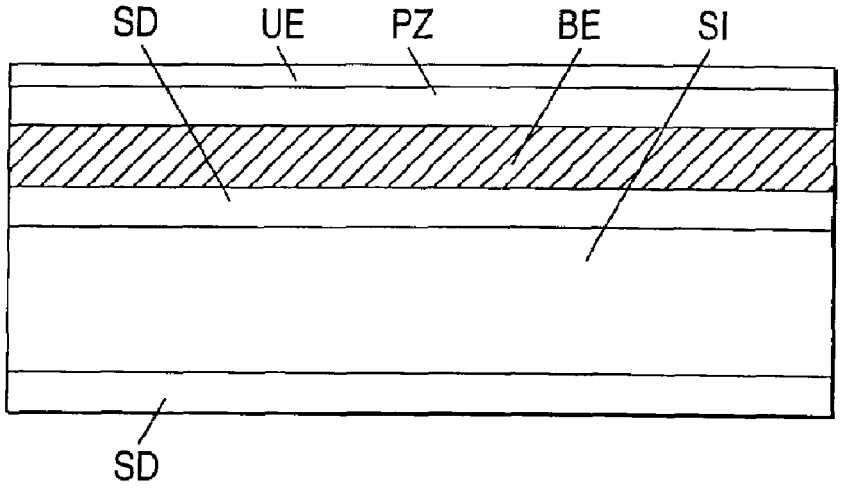
FIG. 20 is a sectional view of a step of the manufacturing method of the ink jet recording head of the invention.
Figure 21:
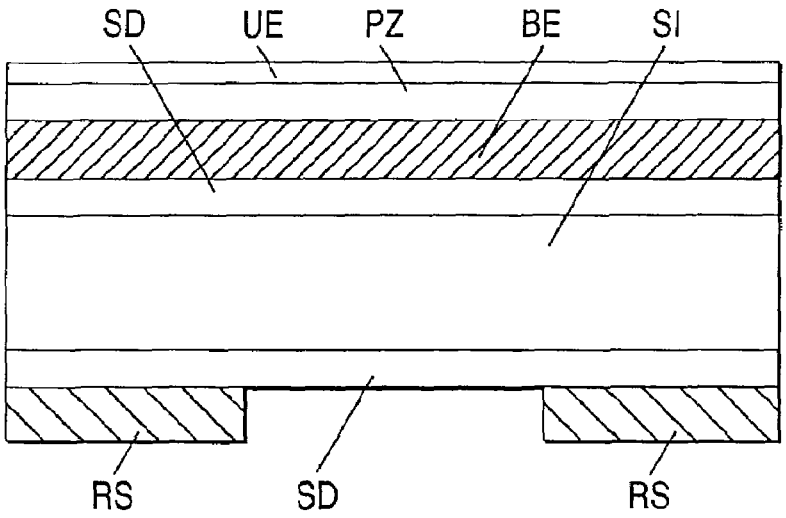
FIG. 21 is a sectional view of a step of the manufacturing method of the ink jet recording head of the invention.

Next, as shown in FIG. 19, a piezoelectric thin film PZ is formed and attached onto the diaphragm-cum-electrode BE of a conductive film. As shown in FIG. 20, an upper electrode UE is formed and attached onto the piezoelectric thin film PZ. As shown in FIG. 21, a patterned mask material RS is formed and attached onto the insulating film SD on the surface of the substrate SI where the piezoelectric thin film PZ is not formed.

Figure 22:
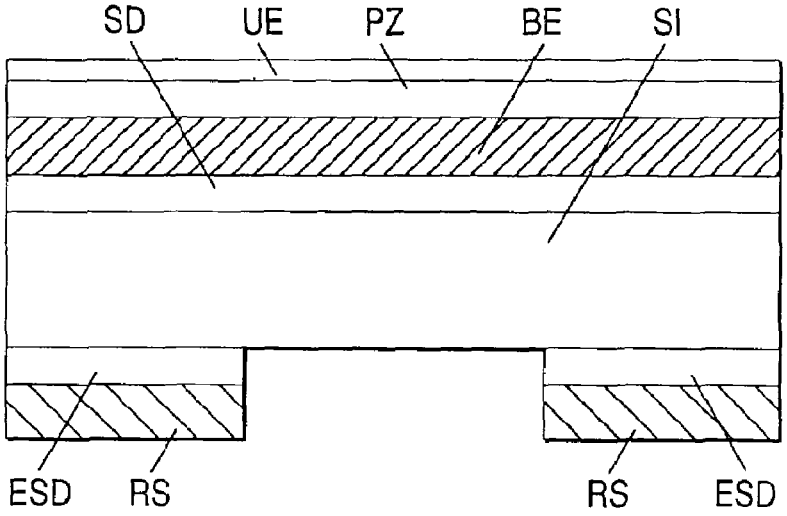
FIG. 22 is a sectional view of a step of the manufacturing method of the ink jet recording head of the invention.
Figure 23:
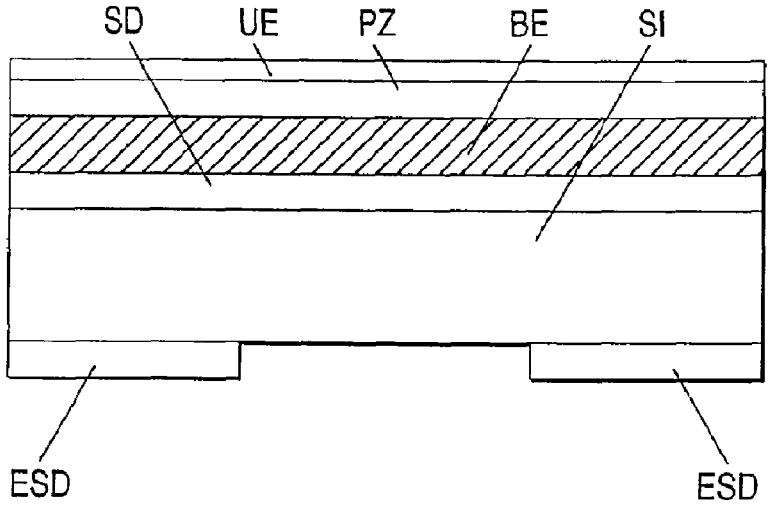
FIG. 23 is a sectional view of a step of the manufacturing method of the ink jet recording head of the invention.
Figure 24:
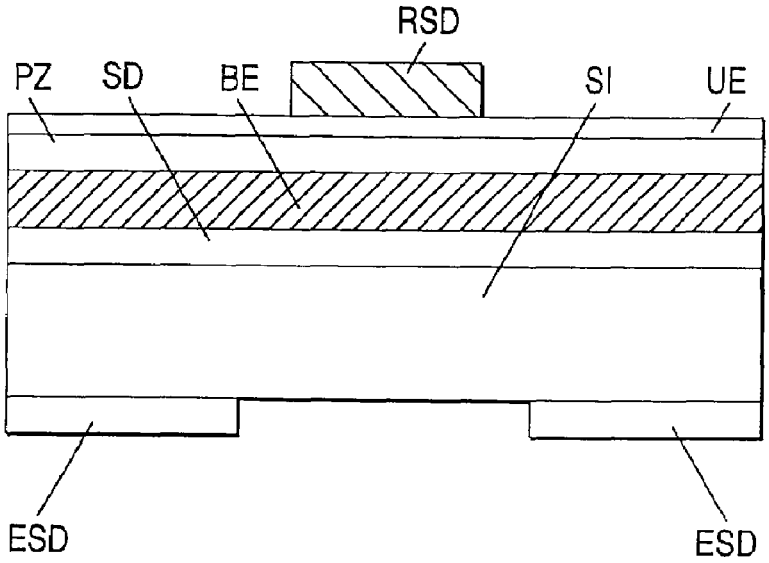
FIG. 24 is a sectional view of a step of the manufacturing method of the ink jet recording head of the invention.
Figure 25:
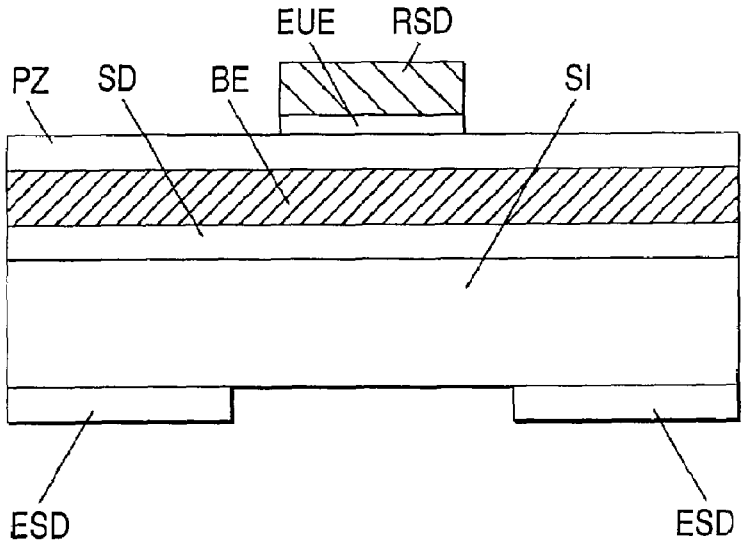
FIG. 25 is a sectional view of a step of the manufacturing method of the ink jet recording head of the invention.

Next, as shown in FIG. 22, the insulating film SD is etched out according to the mask RS, forming patterned insulating films ESD. As shown in FIG. 23, the mask material RS is stripped off. Next, as shown in FIG. 24, a mask material RSD is formed and attached onto the upper electrode UE so as to prepare an area not overlapping the patterned insulating films ESD. As shown in FIG. 25, the etched upper electrode EUE is patterned according to the mask material RSD by a first etching method.

Figure 26:
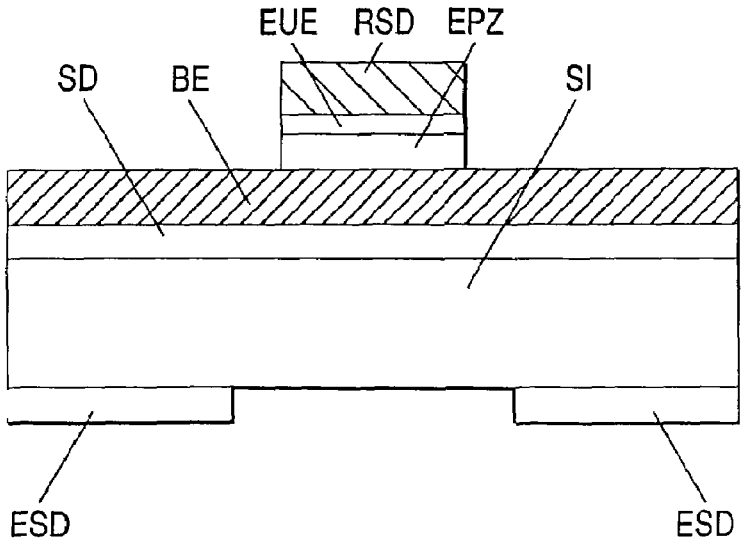
FIG. 26 is a sectional view of a step of the manufacturing method of the ink jet recording head of the invention.
Figure 27:
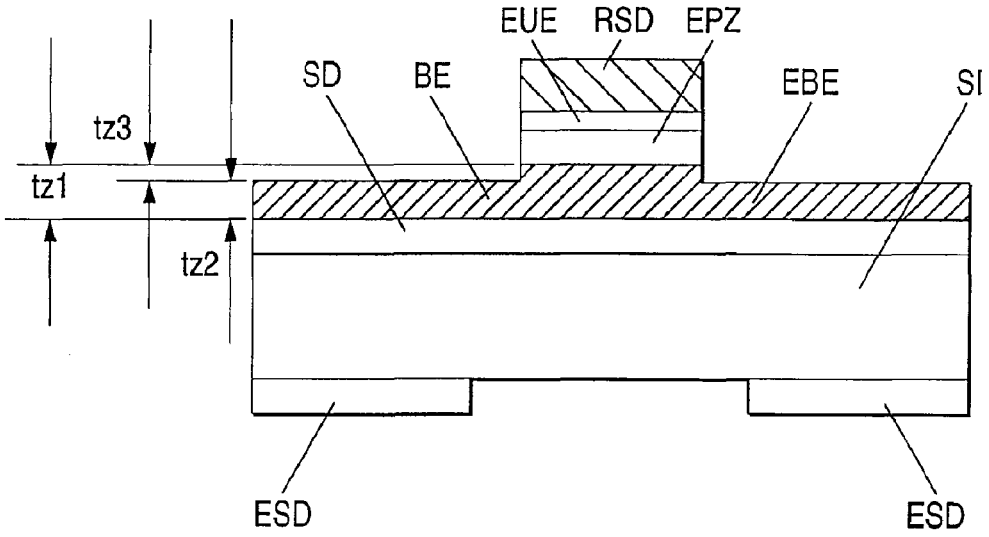
FIG. 27 is a sectional view of a step of the manufacturing method of the ink jet recording head of the invention.

Next, as shown in FIG. 26, the piezoelectric thin film PZ is patterned according to the mask material RSD by a second etching method. As shown in FIG. 27, the diaphragm-cum-electrode BE of the first conductive film having thickness tz1 is etched out from the surface as thick as tz3 so that thickness tz2 is left by a third etching method.

Figure 28:
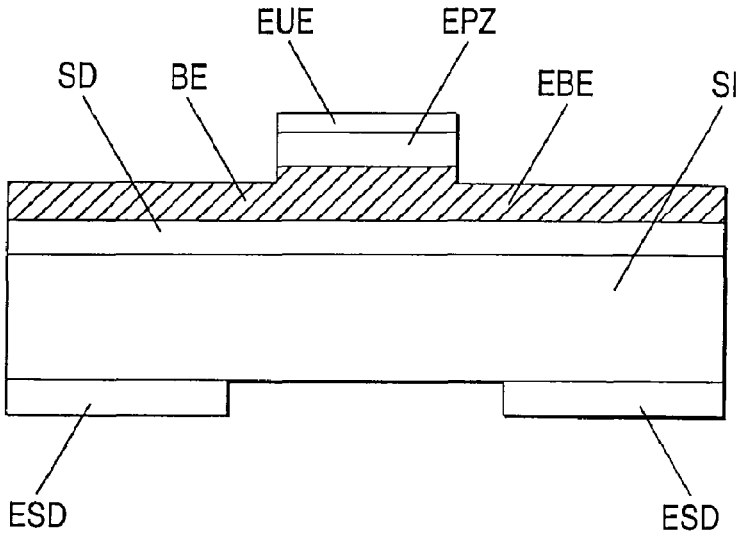
FIG. 28 is a sectional view of a step of the manufacturing method of the ink jet recording head of the invention.
Figure 29:
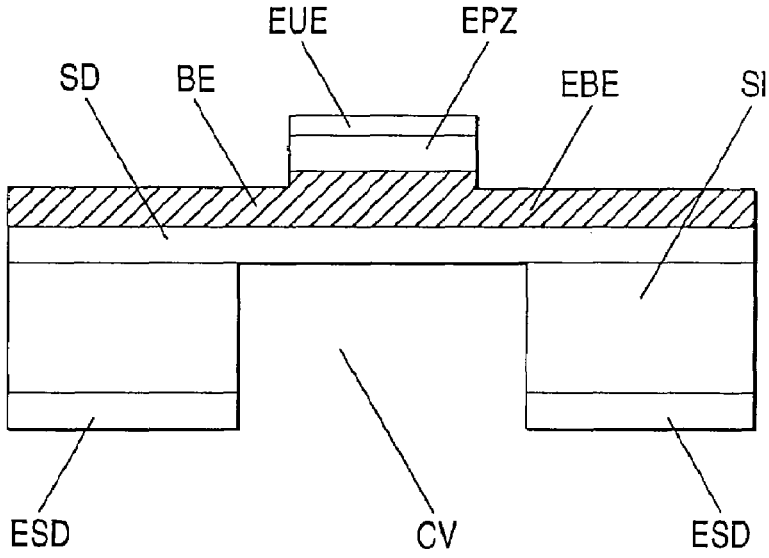
FIG. 29 is a sectional view of a step of the manufacturing method of the ink jet recording head of the invention.

Next, as shown in FIG. 28, the mask material RSD is stripped off. As shown in FIG. 29, the substrate SI is etched out with the etched insulating films ESD as a mask, forming a groove CV.

Figure 30:
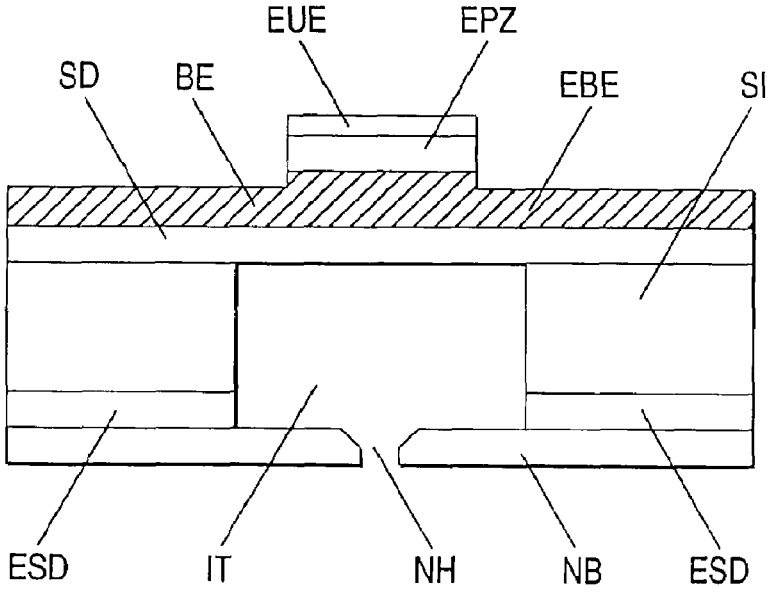
FIG. 30 is a sectional view of a step of the manufacturing method of the ink jet recording head of the invention.

Further, as shown in FIG. 30, a nozzle plate NB formed with a nozzle orifice NH is bonded so as to come in contact with the etched insulating films ESD for forming an ink chamber IT, thereby manufacturing an ink jet recording head substrate.

To match the upper electrode UE, the piezoelectric thin film PZ, and the diaphragm-cum-electrode BE of the conductive film in patterning, the etching method may be an etching method for irradiating with particles accelerated to high energy by an electric field or an electromagnetic field and enabling etching independently of the material.

As shown in FIG. 16, the monocrystalline silicon substrate SI cleaned in a 60% nitric acid solution at 100° C. for 30 minutes or more for cleaning the substrates is prepared. The plane orientation of the monocrystalline silicon substrate is (110). It is not limited to (110) and may be adopted in response to the ink supply passage formation pattern.

Next, as shown in FIG. 17, the insulating films SD are formed on the surfaces of the monocrystalline silicon substrate SI. Specifically, the monocrystalline silicon substrate SI is inserted into a thermal oxidation furnace and oxygen having a purity of 99.999% or more is introduced into the thermal oxidation furnace, then a silicon oxide film 1 μm thick is formed at temperature 1100° C. for five hours. The thermal oxide film formation method is not limited to it and the thermal oxide film may be, for example, a silicon oxide film formed by wet oxidation or a silicon oxide film formed by a reduced pressure chemical vapor phase growth method, an atmospheric pressure chemical vapor phase growth method, or an electron cyclotron resonance chemical vapor phase growth method.

Next, as shown in FIG. 18, the electrode BE of a piezoelectric thin film also serving as a diaphragm of an ink jet recording head is formed and attached onto the silicon oxide film SD formed on one face of the monocrystalline silicon substrate SI. The electrode BE formation method may be a sputtering method, an evaporation method, an organic metal chemical vapor phase growth method, or a plating method. The electrode BE may be made of a conductive substance having mechanical resistance as a diaphragm of an actuator.

A formation method of a platinum electrode BE 800 nm thick by the sputtering method will be discussed. Using a single wafer processing sputtering system provided with a load lock chamber, a silicon substrate formed on the surfaces with a silicon oxide films at initial vacuum degree $10^{-7}$ torr or less is introduced into a reaction chamber and a platinum thin film 800 nm thick is formed and attached onto the silicon oxide films under the conditions of pressure 0.6 Pa, sputtering gas Ar flow quantity 50 sccm, substrate temperature 250° C., output 1 kW, and time 20 minutes. Since the platinum thin film on the silicon oxide film is remarkably inferior in intimate contact property to metal films of Al, Cr, etc., rich in reactivity, a titania thin film several nm to several ten nm thick is formed between the silicon oxide film and the platinum thin film for providing a sufficient intimate contact force.

Next, as shown in FIG. 19, the piezoelectric thin film PZ is formed and attached onto the electrode BE. The piezoelectric thin film PZ is made of lead zirconate titanate or lead zirconate titanate doped with impurities; in the invention, it may be made of either of them.

In the piezoelectric thin film formation method, a film of an organic metal solution containing lead, titanium, and zirconium in sol state is formed by a spin coating method and calcined and hardened by a rapid thermal annealing method, forming the piezoelectric thin film PZ in ceramic state. The piezoelectric thin film PZ is about 1 μm thick. In addition, a sputtering method is available as the manufacturing method of the piezoelectric thin film PZ of lead zirconate titanate.

Next, as shown in FIG. 20, the upper electrode UE for applying a voltage to the piezoelectric thin film is formed and attached onto the piezoelectric thin film PZ. The upper electrode UE is made of a conductive film, preferably a metal thin film such as a platinum thin film, an aluminum thin film, an aluminum thin film doped with impurities of silicon and copper, or a chromium thin film. Here, particularly a platinum thin film is used. The platinum thin film is formed by the sputtering method. It is 100 nm to 200 nm thick. An aluminum thin film having a small young's modulus can be used in addition to the aluminum thin film.

Next, as shown in FIG. 21, the resist thin film patterned like an ink supply passage by photolithography, RS, is formed and attached onto the silicon oxide film SD on the surface of the monocrystalline silicon substrate SI where the piezoelectric thin film PZ is not formed.

Next, as shown in FIG. 22, the silicon oxide film SD in the area not covered with the resist thin films RS is etched out. In the invention, the etching method may be a wet etching method using hydrofluoric acid or a mixed solution of hydrofluoric acid and ammonium or a dry etching method using radicalized freon gas as an etchant.

Next, as shown in FIG. 23, the resist thin film RS as the mask material is stripped off by immersing the silicon substrate formed with the piezoelectric thin film in an organic solvent containing phenol and heating at 90° C. for 30 minutes. Alternatively, the resist thin film RS can also be removed easily by a high-frequency plasma generator using oxygen for reactive gas.

Next, as shown in FIG. 24, the second resist thin film RSD patterned by photolithography is formed and attached onto the upper electrode UE so that it becomes an area overlapping and narrower than the silicon oxide film removal area of the monocrystalline silicon substrate SI.

Next, as shown in FIG. 25, the upper electrode UE is etched out with the resist thin film RSD as a mask for forming the patterned electrode EUE. If the upper electrode UE is made of a platinum thin film, the etching method is a so-called ion milling method by which the platinum thin film is irradiated with argon ions of high energy 500-800 eV.

Next, as shown in FIG. 26, subsequent to the etching of the upper electrode UE, the piezoelectric thin film PZ is etched with the resist thin film RSD left. The etching method is a so-called ion milling method by which the piezoelectric thin film is irradiated with argon ions of high energy 500-800 eV.

As shown in FIG. 27, the electrode BE is etched with the resist thin film RSD left. It is not etched over all the film thickness and is etched out by the thickness tz3, namely, as thick as 400 nm, as shown in FIG. 27. The etching method is a so-called ion milling method by which the piezoelectric thin film is irradiated with argon ions of high energy 500-800 eV.

As in the embodiment, the upper electrode UE, the piezoelectric thin film PZ, and the electrode BE are consecutively irradiated with argon ions having high energy for anisotropic etching, whereby the upper electrode UE and the piezoelectric thin film PZ are patterned according to the resist thin film RSD of the same mask material, thus resulting in a pattern matching within 1 μm of shift. The shift between the piezoelectric thin film PZ pattern and the unetched area of the electrode BE also becomes within 1 μm.

This etching etches not only the etched films, but also the resist thin film of the mask material. The resist thin film etching rate ratio between platinum and novolac resin family by irradiation with argon ions of high energy is 2:1 and the resist etching rate ratio between lead zirconate titanate and novolac resin family by irradiation with argon ions of high energy is 1:1. Thus, the resist RSD film of the mask material is made 1.8-2.5 gm thick.

Next, as shown in FIG. 28, the resist thin film RSD is dissolved and removed in a phenol family organic solvent or is removed by a high-frequency plasma etching system using oxygen gas.

Next, as shown in FIG. 29, the silicon surface exposure area of the monocrystalline silicon substrate SI where the piezoelectric thin film is not formed is etched for forming the groove CV. For this etching, the silicon substrate is immersed in a 5%-40% potassium hydroxide aqueous solution at 80° C. for 80 minutes to three hours and silicon is etched until the silicon oxide film SD on the side of the monocrystalline silicon substrate SI where the piezoelectric thin film is formed is exposed. When the silicon etching is executed, the silicon substrate surface on the piezoelectric thin film side may be formed with a protective film or a partition wall for protecting against the etching solution so that the piezoelectric thin film does not come in contact with the etching solution.

When the plane orientation of the monocrystalline silicon substrate is (110), if the wall faces defining the groove CV are designed so that (111) plane appears, the etching rate of the (111) plate of monocrystalline silicon to a potassium hydroxide aqueous solution is 1/100-1/200 of that of the (110) plane, thus the walls of the groove CV are formed almost perpendicularly to the device formation face of the monocrystalline silicon substrate.

Next, as shown in FIG. 30, the nozzle plate NB 0.1-1 mm thick is bonded to the surface of the silicon oxide film SD so as to cover the groove CV formed by the etching, forming the ink chamber IT. The nozzle plate NB is made of a material having a high young's modulus and high rigidity, such as a stainless, copper, plastic, or silicon substrate. It is bonded in an adhesive or by an electrostatic force between the silicon oxide film SD and plate. The nozzle plate NB is formed with the nozzle orifice NH for jetting ink in the ink chamber IT to the outside by the diaphragm-cum-electrode BE vibrated by drive of the piezoelectric thin film PZ.

Figure 31:
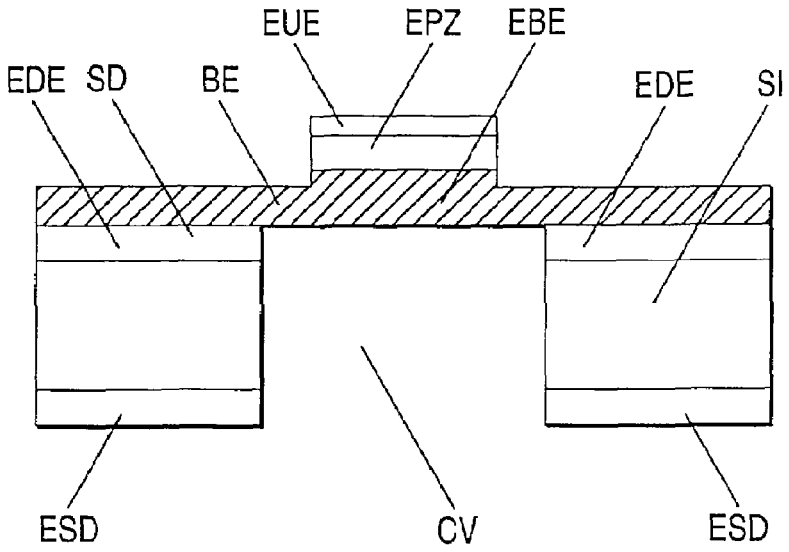
FIG. 31 is a sectional view of a step of a manufacturing method of the ink jet recording head of the invention.

Next, a manufacturing method of the embodiment previously described with reference to FIG. 13 will be discussed. In the embodiment, the same steps as those previously described with reference to FIGS. 16 to 29 are executed. As shown in FIG. 31, following the step in FIG. 29, the silicon oxide film whose surface is exposed with silicon etched out is etched out in a hydrofluoric acid aqueous solution or a mixed solution of hydrofluoric acid and ammonium fluoride, exposing the surface of the diaphragm-cum-electrode BE.

The silicon oxide film etching method may be a dry etching method for irradiating with plasma generated at high frequencies as well as the wet etching.

Figure 32:
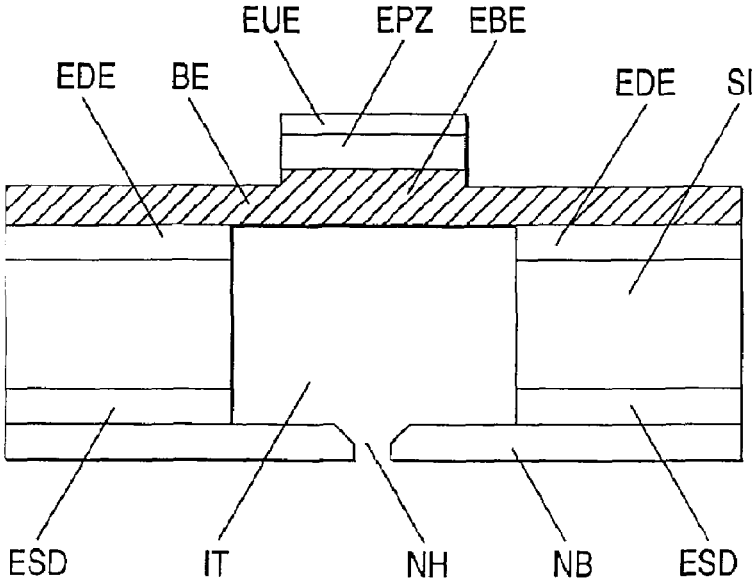
FIG. 32 is a sectional view of a step of the manufacturing method of the ink jet recording head of the invention.

Next, as shown in FIG. 32, the nozzle plate NB is bonded to the surface of the silicon oxide film SD so as to cover the groove CV formed by the etching.

Figure 33:
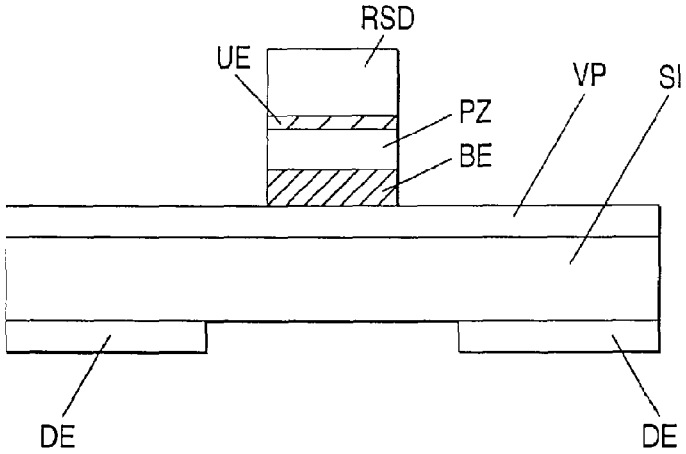
FIG. 33 is a sectional view of a step of a manufacturing method of the ink jet recording head of the invention.
Figure 34:
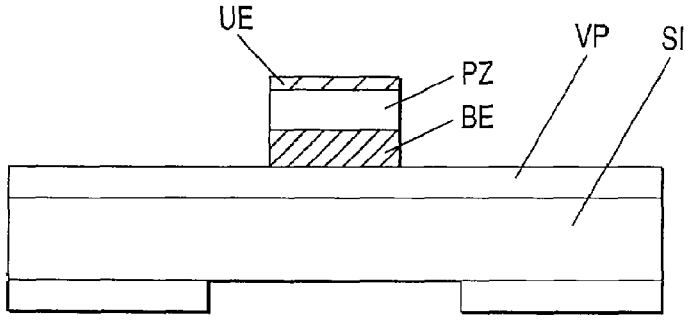
FIG. 34 is a sectional view of a step of the manufacturing method of the ink jet recording head of the invention.
Figure 35:
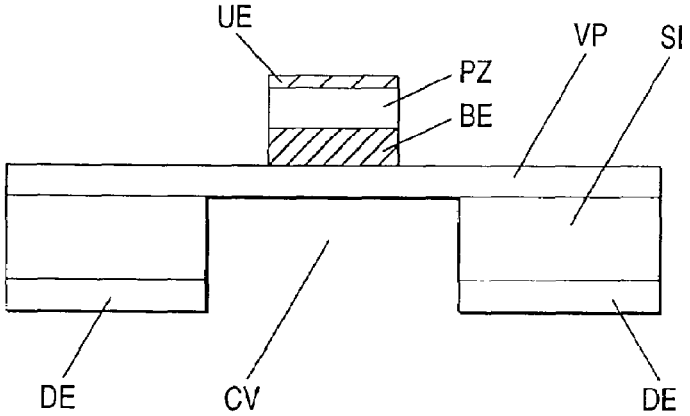
FIG. 35 is a sectional view of a step of the manufacturing method of the ink jet recording head of the invention.

Next, a manufacturing method of the embodiment previously described with reference to FIG. 14 will be discussed. In the embodiment, the same steps as those previously described with reference to FIGS. 16 to 26 are executed. As shown in FIG. 33, following the step in FIG. 26, the diaphragm-cum-electrode BE of the first conductive film is etched out according to the mask material R5D. Next, as shown in FIG. 34, the mask material RSD is stripped off. Next, as shown in FIG. 35, the substrate SI is etched out with the patterned insulating films ESD as a mask, forming the groove CV.

Figure 36:
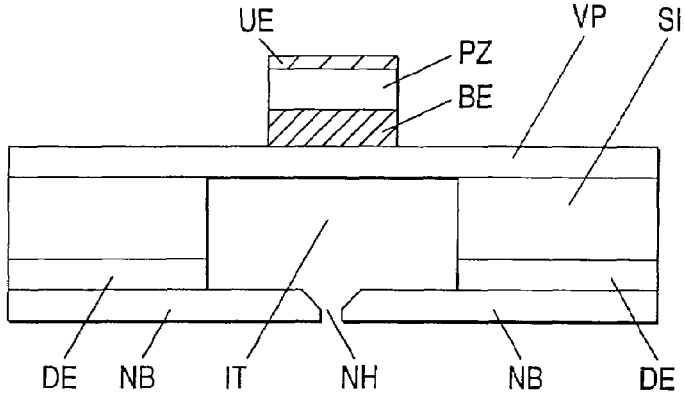
FIG. 36 is a sectional view of a step of the manufacturing method of the ink jet recording head of the invention.

Next, as shown in FIG. 36, the nozzle plate NB is bonded to the patterned insulating films ESD so as to cover the groove CV for forming the ink chamber IT, thereby manufacturing the ink jet recording head substrate.

In the embodiment, the film of the resist RSD of the mask material is made 2-3 μm thick. As shown in FIG. 34, the resist thin film RSD is dissolved and removed in a phenol family organic solvent or is removed by a high-frequency plasma etching system using oxygen gas.

Next, a manufacturing method of the embodiment previously described with reference to FIG. 15 will be discussed. In the embodiment, the same steps as those previously described with reference to FIGS. 16 to 26 are executed.

Figure 37:
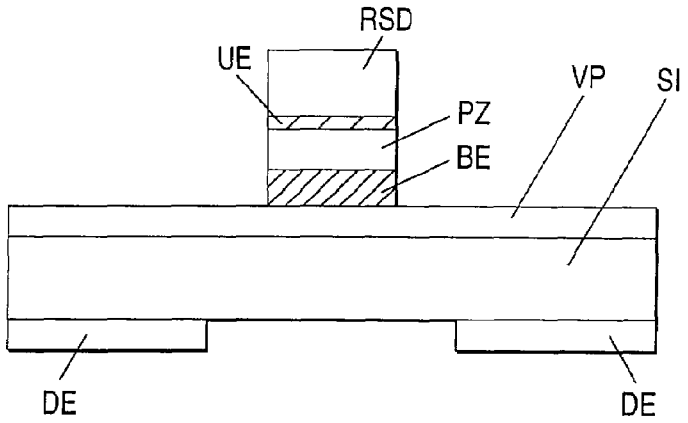
FIG. 37 is a sectional view of a step of a manufacturing method of the ink jet recording head of the invention.
Figure 38:
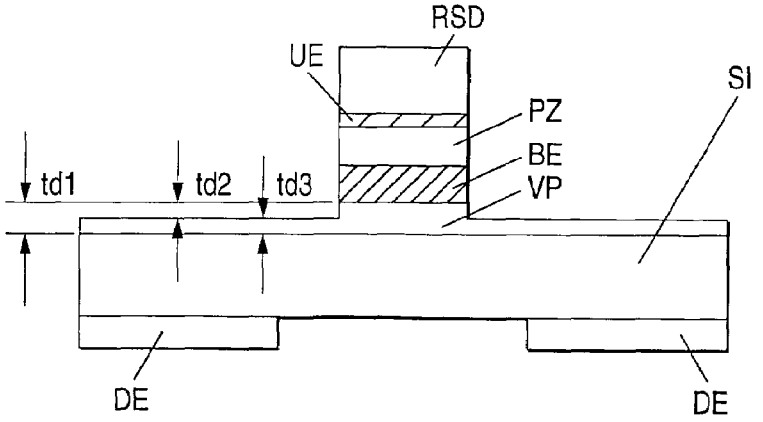
FIG. 38 is a sectional view of a step of the manufacturing method of the ink jet recording head of the invention.
Figure 39:
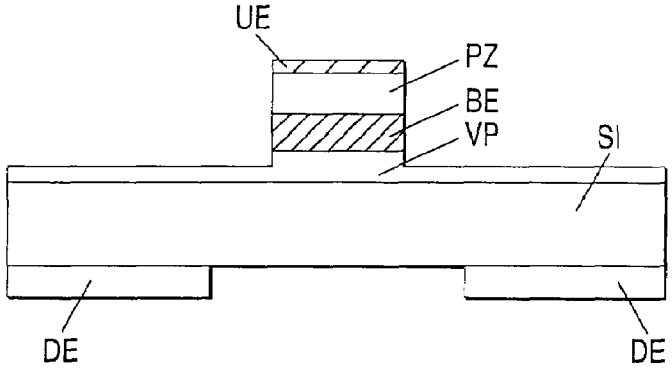
FIG. 39 is a sectional view of a step of the manufacturing method of the ink jet recording head of the invention.

As shown in FIG. 37, following the step in FIG. 26, the diaphragm-cum-electrode BE of the first conductive film is etched out with the resist thin film RSD as a mask. Next, as shown in FIG. 38, the insulating film VP having thickness td1 is etched out from the surface as thick as td3 so that thickness td2 is left according to the mask material RSD. Next, as shown in FIG. 39, the mask material RSD is stripped off.

Figure 40:
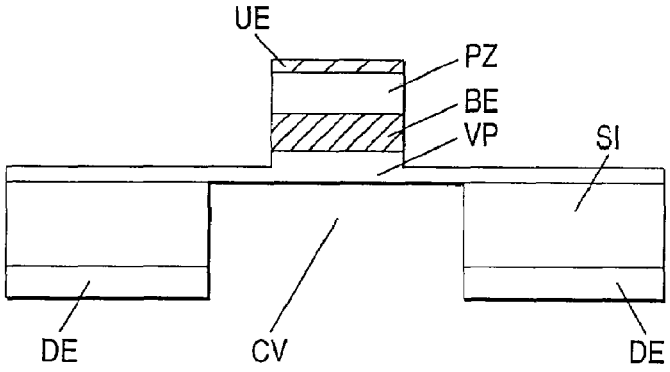
FIG. 40 is a sectional view of a step of the manufacturing method of the ink jet recording head of the invention.
Figure 41:
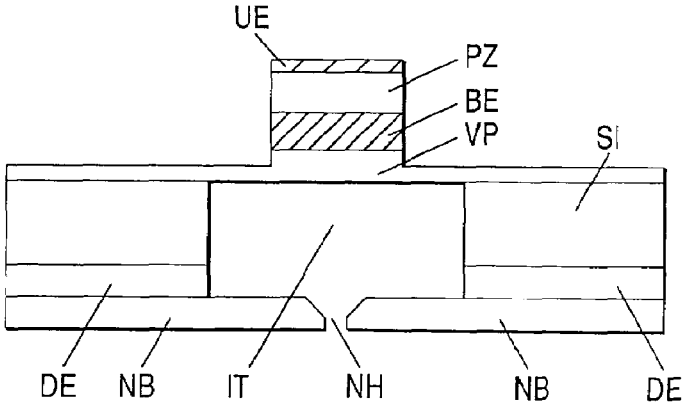
FIG. 41 is a sectional view of a step of the manufacturing method of the ink jet recording head of the invention.

Next, as shown in FIG. 40, the substrate SI is etched out with the etched insulating films ESD as a mask material, forming a groove CV. Further, as shown in FIG. 41, the nozzle plate NB formed with the nozzle orifice NH is bonded so as to come in contact with the etched insulating films ESD for forming the ink chamber IT, thereby manufacturing the ink jet recording head substrate.

As shown in FIG. 37, following the step in FIG. 26, the diaphragm-cum-electrode BE is etched out with the resist thin film RSD as a mask. The etching method is a so-called ion milling method by which the diaphragm-cum-electrode BE is irradiated with argon ions of high energy 500-800 eV. In addition, the diaphragm-cum-electrode BE can also be etched out if dry etching is executed whereby BE is irradiated with anisotropic high energy particles.

Next, as shown in FIG. 38, the insulating film VP having thickness td1 is etched out from the surface 500 nm as thick as td3 so that thickness td2 is left with the resist thin film RSD as a mask.

According to the manufacturing method, the shift between the piezoelectric thin film PZ pattern and the unetched area of the electrode BE also becomes within 1 μm. The film of the resist RSD of the mask material is 2.5-3.5 μm thick.

Next, as shown in FIG. 39, the resist thin film RSD is dissolved and removed in a phenol family organic solvent or is removed by a high-frequency plasma etching system using oxygen gas.

Next, after the resist thin film RSD is removed, as shown in FIG. 40, the silicon surface exposure area of the monocrystalline silicon substrate SI where the piezoelectric thin film is not formed is etched for forming the groove CV. When the silicon etching is executed, the silicon substrate surface on the piezoelectric thin film side may be formed with a protective film or a partition wall for protecting against the etching solution so that the piezoelectric thin film does not come in contact with the etching solution.

Next, as shown in FIG. 41, the nozzle plate NB is bonded to the surface of the silicon oxide film SD so as to cover the groove CV formed by the etching, forming the ink chamber IT.

As we have discussed, according to the ink jet recording head of the invention, there is no pattern shift between the piezoelectric thin film and the electrode, so that an electric field can be effectively applied to the piezoelectric thin film for providing a sufficient displacement. Resultantly, the jet performance of the ink jet recording head improves and becomes stable. Further, the upper electrode and the piezoelectric thin film can be patterned with a single mask, improving productivity.

Further, since the structure of the recording head provides a drastically large vibration capability of the diaphragm of an active element for jetting ink as compared with conventional structures, the following effects can be produced:

(1) Since the diaphragm has a large vibration amount, the volume displacement of the ink chamber increases. Therefore, a larger amount of ink than was previously possible can be jetted, so that an ink jet recorder for realizing clearer print quality can be provided.

(2) Since the diaphragm has a large vibration amount, the volume displacement of the ink chamber increases. Therefore, if the ink jet amount is the same as the previous amount, an ink chamber of a volume smaller than the conventional ink chamber may be installed, so that the ink jet recording head becomes smaller in size than was previously possible. Thus, a more compact ink jet recorder can be provided.

(3) Since the diaphragm has a large vibration amount, if the piezoelectric thin film has a smaller displacement capability than was previously possible, an ink jet recording head can be provided. Thus, the piezoelectric thin film may be several μm thick, so that the need for using a bulk piezoelectric thin film is eliminated; films can be formed by a spinner and piezoelectric elements can be easily formed by the sputtering method. Thus, ink jet recording heads can be manufactured in a thin-film process enabling high-volume manufacturing, so that inexpensive and high-quality ink jet recording heads can be provided.

(4) Since the etching method for irradiating with high-energy particles is used for patterning, the etching patterns of the piezoelectric thin film, the electrode for applying a voltage, and compliance increase match with extremely high accuracy, so that the capacity does not vary from one element to another. Thus, ink jet recording heads extremely high in print quality uniformity can be provided.

What is claimed is:

1. A method of manufacturing an ink jet recording head, the method comprising:

providing a laminated structure in which a first electrode layer is located [on] *above* a diaphragm, a piezoelectric layer is located [on] *above* the first electrode layer, and a second electrode layer is located [on] *above* the piezoelectric layer;

etching the first electrode layer, the second electrode layer and the piezoelectric layer so that a portion of the diaphragm is exposed; and attaching the diaphragm to a substrate, wherein at least the second electrode layer and the piezoelectric layer are etched [simultaneously by a dry etching method] *using a common mask material to pattern the second electrode layer and the piezoelectric layer.*

2. The method according to claim 1, further comprising attaching a nozzle plate to the substrate.

3. The method according to claim 2, further comprising forming a nozzle orifice in the nozzle plate.

4. A method of manufacturing an ink jet recording head including a first electrode layer [on] *above* a diaphragm, a piezoelectric layer [on] *above* the first electrode layer and a second electrode layer [on] *above* the piezoelectric layer, the method comprising:

etching the first electrode layer, the second electrode layer and the piezoelectric layer so that a portion of the diaphragm is exposed, *and*

*attaching the diaphragm to a substrate,* wherein at least the second electrode layer and the piezoelectric layer are etched [by a dry etching method in a same etching step] *using a common mask material to pattern the second electrode layer and the piezoelectric layer*.

5. The method according to claim 4, wherein [the] *at least the second electrode layer and the piezoelectric layer are etched by a* dry etching method *which* is an ion milling method.

6. The method according to claim 5, wherein the ion milling method is irradiating with argon ions.

7. The method according to claim 4, wherein [the] *at least the second electrode layer and the piezoelectric layer are etched by a* dry etching method *which* is a reactive ion etching method.

8. The method according to claim 4, wherein the second electrode layer, the piezoelectric layer and the first electrode layer are etched [by a dry etching method in a same etching step] *using the common mask material to pattern the second electrode layer, the piezoelectric layer and the first electrode layer*.

* * * * *